(12) United States Patent
Tamura et al.

(10) Patent No.: US 8,420,040 B2
(45) Date of Patent: Apr. 16, 2013

(54) ORGANIC-INORGANIC COMPOSITE AND POLYMERIC COMPOSITE MATERIAL, AND METHOD PRODUCING THEM

(75) Inventors: Kenji Tamura, Tsukuba (JP); Hirohisa Yamada, Tsukuba (JP); Shingo Yokoyama, Tsukuba (JP); Tsutomu Sato, Kanazawa (JP)

(73) Assignee: National Institute for Materials Science, Tsukuba-Shi (JP)

( * ) Notice: Subject to any disclaimer, the term of this patent is extended or adjusted under 35 U.S.C. 154(b) by 1150 days.

(21) Appl. No.: 11/661,311

(22) PCT Filed: Aug. 25, 2005

(86) PCT No.: PCT/JP2005/015959
§ 371 (c)(1),
(2), (4) Date: Feb. 27, 2007

(87) PCT Pub. No.: WO2006/022431
PCT Pub. Date: Mar. 2, 2006

(65) Prior Publication Data
US 2007/0259992 A1    Nov. 8, 2007

(30) Foreign Application Priority Data

Aug. 27, 2004  (JP) .................. 2004-248134

(51) Int. Cl.
*C08K 3/34*  (2006.01)
*C01B 33/42*  (2006.01)

(52) U.S. Cl.
USPC ........................................ 423/328.3; 524/449

(58) Field of Classification Search .................. 524/442, 524/444–449; 423/324–328.3
See application file for complete search history.

(56) References Cited

U.S. PATENT DOCUMENTS

| 4,757,040 | A | * | 7/1988 | Guan et al. ..................... 502/63 |
| 6,017,632 | A | * | 1/2000 | Pinnavaia et al. ............. 428/403 |
| 6,096,803 | A | * | 8/2000 | Pinnavaia et al. ............. 523/209 |
| 6,387,996 | B1 | * | 5/2002 | Lan et al. ....................... 524/445 |
| 6,828,367 | B1 | * | 12/2004 | Campbell ....................... 524/186 |
| 2009/0233107 | A1 | * | 9/2009 | Yamada et al. ............... 428/446 |

FOREIGN PATENT DOCUMENTS

| JP | H08-012987 | | 1/1996 |
| JP | 09087096 | A * | 3/1997 |
| JP | H10-218732 | | 8/1998 |
| JP | 2004-217501 | | 8/2004 |
| WO | WO 2004039916 | A1 * | 5/2004 |

OTHER PUBLICATIONS

Huntsman: Product Information of JEFFAMINE 505 and JEFFAMINE 506. p. 1-4.*
Crystals Land (Synthetic Mica-Fluorophlogopite, 1 page).*
Akcay (Nonyl-and Docecylamines Intercalated Bentonite and Illite From Turkey. Turk J Chem, 1999, 23, pp. 105-113).*
Derwent Abstract of JP 09087096 A.*
Adsorption and desorption behavior of ammonium ion on expandable illite. (Transactions of the material Research Society of Japan. Dec. 2005, 30(4), 1045-1048), 6 pages.*
Karahan (Removal of boron from aqueous solution by clays and modified clays. Journal of Colloid and Interface Science, 293 (2006) pp. 36-42).*
Akcay (Removal of Various Phenoxyalkanoic Acid Herbicides from Water by Organo-clays. Acta hydrochim. Hydrobiol. 28 (2000), pp. 300-304).*

* cited by examiner

*Primary Examiner* — Ling Choi
*Assistant Examiner* — Brieann R Fink
(74) *Attorney, Agent, or Firm* — Manabu Kanesaka (57) ABSTRACT

An organic-inorganic composite is useful as a sheeted filler having a high aspect ratio. A positively charged organic compound is intercalated into a non-swelling layered silicate that is composed of mica and has K ions between the layers, and has primary particles of 2 µm to 500 µm as an average particle size. The layered silicate is represented as the formula: $(K_a M_{0.1-b})(X_c Y_d)(Si_{4-e} Al_e)O_{10}(OH_f F_{2-f})$, wherein $0.6 \leq a \leq 1.0$, $0 \leq b \leq 0.1$, $1.0 \leq c \leq 3$, $0 \leq d \leq 2$, $2 \leq c+d \leq 3$, $0 \leq e \leq 4$, $0 \leq f \leq 2$; M is a cation other than K which is between layers and at least one of Li, Na, Rb, Cs, $NH_4$, Be, Mg, Ca, Sr, Ba, Mn, Fe, Ni, Cu, Zn and Al; X and Y are metals enclosed in an octahedral formed in a 2:1 typed sheet; X is at least one of Mg, Fe, Mn, Ni, Zn and Li; and Y is at least one of Al, Fe, Mn and Cr.

22 Claims, 3 Drawing Sheets

ORGANIC-INORGANIC COMPOSITE AND POLYMERIC COMPOSITE MATERIAL, AND METHOD PRODUCING THEM

TECHNICAL FIELD

The present invention relates to an organic-inorganic composite wherein organic cations are inserted between the layers of a high-crystalline non-swelling layered silicate that has K ions between the layers, and polymeric composite material containing the organic-inorganic composite and methods for producing them.

BACKGROUND ART

Research and development of polymer-clay nanocomposites wherein dispersion of swelling layered silicates composed mainly of clay minerals are controlled at nanometer level are being performed actively as means of improving heat resistance, rigidity and gas barrier of polymer materials. Swelling layered silicates such as smectite, which are one kind of clay minerals, have ion-exchangeability and swelling property for water due to hydration of ions between the layers.

Recently, swelling fluorine mica that has Na, Li and the like between the layers has been obtained artificially and used in polymer-clay nanocomposites. This swelling fluorine mica is higher crystalline and has larger particle forms than smectite, however, it is in the microcrystal form compared with non-swelling mica minerals naturally produced.

Complexing smectic swelling layered silicates with polymer materials does not result in well-performed reinforcement effect generated by complexing because its hydrophilic nature decreases dispersion of hydrophobic polymers. Therefore, polymer-clay nanocomposites are produced by inserting (intercalating) beforehand between layers organic molecules that have high affinity with the matrix polymers or monomers that is to be raw materials of the polymer materials, and performing organizing treatment followed by complexing or polymerization between layers with polymer materials.

Specifically, for swelling layered silicates that have undergone organizing treatment, a number of studies have been done and there are reports for various systems including not only organic-inorganic composites of alkyl ammonium and smectite (Nonpatent Literature 1), but also composites of diammonium compounds or heteroaromatic cations with swelling layered silicates (Patent Documents 1 and 2), composites of alkyl amines with swelling fluorine mica (Patent Document 3) etc.

Further, for polymer-clay nanocomposites, a method wherein organic clay is added in any step in producing polyamide forms (Patent Document 4), polyamide compositions wherein cation exchangeable layered silicates are ionic bound and methods for producing them (Patent Documents 5 and 6), as well as polyamide compositions and thermoplastic resin compositions wherein swelling fluorine mica that has undergone organizing treatment (Patent Documents 7 and 8) is used and methods for producing them have been proposed. On the other hand, it is generally recognized that mica clay minerals and mica minerals wherein ions between the layers are K ions are non-swelling and nonion-changeable. It is considered that this non-swelling property is caused by electrostatic crosslinking effect of K ion fitted in the hexagonal ring of oxygen on the surfaces of two sheets (e.g. Nonpatent Literature 2).

Non-patent Literature 1: MacEwan, D. M. C. and Wilson, M. J., Interlayer and Intercalation Complexes of Clay Minerals, In "Crystal Structure of Clay Minerals and their X-ray identification" Brindley G. W., Brown, G editors, London: Mineralogical Society, (1980) 197-248

Non-patent Literature 2: H. van Olphen, Chap. 5 Clay Mineralogy, III. ILLITE (NONEXPANDIND 2:1 LAYER CLAYS), In "An Introduction to Clay Colloid Chemistry: for clay technologists, geologists, and soil scientists" 2nd ed, New York: Wiley, (1977) 68-69

Patent Document 1: Japanese Patent Laid-Open No. 63-242915 (Japanese Patent Publication No. 5-74526)

Patent Document 2: Japanese Patent Laid-Open No. 8-337414)

Patent Document 3: Japanese Patent Laid-Open No. 59-223218 (Japanese Patent Publication No. 2-27282)

Patent Document 4: Japanese Patent Laid-Open No. 48-103653

Patent Document 5: Japanese Patent Laid-Open No. 51-109998

Patent Document 6: Japanese Patent Laid-Open No. 62-74957

Patent Document 7: Japanese Patent Laid-Open No. 08-134205

Patent Document 8: Japanese Patent Laid-Open No. 2000-053805

DISCLOSURE OF INVENTION

Problems to be Solved by the Invention

For conventional nanocomposites using swelling layered silicates, which are low specific gravity and have markedly improved heat resistance, rigidity and gas barrier properties compared with talc or mica filled composites, are available. They are, however, much inferior to glass fiber filling composites (FRP) for rigidity and heat resistance if not regarding difference of specific gravity and they may not respond to current high level requirements.

In pedology, clay is defined as the smallest inorganic particle in the soil and according to rules of the International Pedology Society; it is defined as particle not more than 2.0 µm as polycrystal (see Japanese Clay Society ed., "Clay Handbook", 2nd. version, item 1-6, Gihohdo Shuppan). Synthesized fluorine mica which shows swelling property to water similarly to smectite does has higher crystalline in the direction of a and b axes, larger each sheet area and greater particle size of the crystal while it may have finer particle crystals compared with non-swelling layered silicates such as mica minerals and mica clay minerals.

Description of Organization of such non-swelling mica clay minerals and mica minerals is partly seen in the above patent references (Patent Documents 1 and 2), however, they have not shown specific illustration. Also, in the studies of the present inventors, it was impossible to ion-exchange positively charged organic compounds besides metal ions such as Na and Li.

When applying layered silicates to nanocomposites, it is considered to be a key for markedly improving physical properties of the material that they show high aspect ratio being dispersed in the polymer matrix. However, most of layered silicates having greater crystal particles of not less than 10 micron in the primary particle size have non-exchangeable potassium as the ion between the layers in view of situation of natural production and information from synthetic experiments, therefore they have high charge density showing non-swelling to water. Accordingly, it is considered impossible for them to not only be delaminated and dispersed (flaked) but even also to have organic molecules inserted between the layers, and it has been regarded that use of big crystal particles is in the trading off relationship with exfoliating in the matrix. Thus, there is currently almost no study of polymer-clay nanocomposites using high crystalline layered silicates.

The present invention has been done in order to develop new technology of polymer-clay nanocomposites in view of the situation, and it enables production of organic-inorganic composites wherein high-crystalline non-swelling layered silicates are organized and polymer composite materials wherein the layered silicates are detached and delaminated in the polymer matrix.

Means for Solving Problems

The inventors made every effort to solve the above problems, and consequently, it has been found that organic-inorganic composites can be formed by substituting K ions between layers of high-crystalline non-swelling layered silicates composed of mica with any positively charged organic compound under specific conditions, leading to completion of the invention which enables production of polymer composite materials which have the layered silicates delaminated and dispersed. Namely, the invention solved by considering constitution shown in the following [1] to [11].

[1] An organic-inorganic composite, wherein a positively charged organic compound is intercalated into a non-swelling layered silicate that is composed of mica and has K ions between the layers and has primary particles of 2 μm to 500 μm as an average particle size, the layered silicate being represented as the following formula:

wherein $0.6 \leq a \leq 1.0$, $0 \leq b \leq 0.1$, $1.0 \leq c \leq 3$, $0 \leq d \leq 2$, $2 \leq c+d \leq 3$, $0 \leq e \leq 4$, $0 \leq f \leq 2$; M is a cation other than K which is between layers and at least one of Li, Na, Rb, Cs, $NH_4$, Be, Mg, Ca, Sr, Ba, Mn, Fe, Ni, Cu, Zn and Al; X and Y are metals enclosed in an octahedral formed in a 2:1 typed sheet; X is at least one of Mg, Fe, Mn, Ni, Zn and Li; and Y is at least one of Al, Fe, Mn and Cr.

[2] The organic-inorganic composite according to [1], wherein the layered silicate is a mica clay mineral represented as the following general formula:

wherein $0.6 \leq a \leq 0.9$, $0 \leq b \leq 0.1$, $1.0 \leq c \leq 3$, $0 \leq d \leq 2$, $2 \leq c+d \leq 3$, $0 \leq e \leq 4$, $0 \leq f \leq 2$; M is a cation other than K which is between the layers, and is at least one of Li, Na, Rb, Cs, $NH_4$, Be, Mg, Ca, Sr, Ba, Mn, Fe, Ni, Cu, Zn and Al; X and Y are metals enclosed in an octahedral formed in a 2:1 typed sheet; X is at least one of Mg, Fe, Mn, Ni, Zn and Li; Y is at least one of Al, Fe, Mn and Cr.

[3] The organic-inorganic composite according to [1] or [2], wherein the positively charged organic compound is selected from primary to tertiary amine salts, a quaternary ammonium salt and an amino acid salt, wherein the number of carbons is not less than 8.

[4] The organic-inorganic composite according to any one of [1] to [3], wherein K ion that is an ion between layers of the layered silicate is ion-exchanged with a positively charged organic compound, and 0.6 to 5 equivalents of the positively charged organic compound to a cation exchange volume of the layered silicate are contained in the organic-inorganic composite.

[5] A polymer composite material, comprising 0.1 to 40% by mass of the organic-inorganic composite according to any one of [1] to [4] therein.

[6] The polymer composite material according to [5], wherein the organic-inorganic composite is dispersed in the polymer composite material in a swelling state such that the average distance between the layers of the layered silicate is not less than 3.0 nm.

[7] A method of producing an organic-inorganic composite, comprising a step (I) wherein a layered silicate is contacted with a positively charged organic compound (a) to form an organic-inorganic composite (A) wherein K ion between the layers is substituted with a positively charged organic compound (a).

[8] A method of producing an organic-inorganic composite, comprising a step (I) wherein a layered silicate is contacted with a positively charged organic compound (a) to form an organic-inorganic composite (A) wherein K ion between the layers is substituted with a positively charged organic compound (a), followed by a step (II) wherein a positively charged organic compound (b) which is a different species from the positively charged organic compound (a) is contacted with the organic-inorganic composite (A) to form an organic-inorganic composite (B) wherein the positively charged organic compound (a) is substituted with the positively charged organic compound (b).

[9] The method of producing an organic-inorganic composite according to [8], wherein the positively charged organic compound (a) used in the step (I) of the process for producing the organic-inorganic composite (B) is at least one selected from primary to tertiary amine salts, a quaternary ammonium salt, wherein the number of carbons is not less than 8.

[10] The method of producing an organic-inorganic composite according to [7] or [8], wherein a concentration of the positively charged organic compound solution is not less than 0.01 N and a solid liquid ratio of the layered silicate/the positively charged organic compound solution is not more than 0.1 (mass ratio) in the step (I) and the step (II).

[11] The method of producing a polymer composite material according to [5] or [6], wherein 0.1 to 40% by mass of the organic-inorganic composite according to any one of [1] to [4] is added as a filler in the polymer material.

Effect of the Invention

The present invention has accomplished an organic-inorganic composite that uses a layered silicate having non-swelling property and large crystal particles. It has been considered that the layered silicate can hardly be delaminated and dispersed (flaked) and also organic molecules can hardly be inserted between the layers. For the layered silicate particles used in the invention, the original particles have higher aspect ratio than synthetic fluoro-mica particles and the like, and by using them as a filler and exfoliating in the polymer process during production of a composite with a polymer, much higher aspect ratio will be provided than that obtained when using conventional smectite nanocomposite or synthetic fluoromica nanocomposite, which will yield great reinforcement effect.

BEST MODE FOR CARRYING OUT THE INVENTION

In an organic-inorganic composite of the invention the general formula of which is represented as the formula below, and characterized in that it comprises intercalating a positively charged organic compound into a layered silicate composed of mica wherein the average particle size of the primary particle is 2 μm to 500 μm and the ion between the layers is K, the layered silicate which meets the following equation is used.

$$[(K_aM_{0.1-b})(X_cY_d)(Si_{4-e}Al_e)O_{10}(OH_fF_{2-f})]$$

wherein, $0.6 \leq a \leq 0.9$, $0b \leq 0.1$, $1.0 \leq c \leq 3$, $0d \leq 2$, $2 \leq c+d \leq 3$, $0 \leq e \leq 4$, $0 \leq f \leq 2$; M is a cation other than K which is between layers and at least one of Li, Na, Rb, Cs, NH$_4$, Be, Mg, Ca, Sr, Ba, Mn, Fe, Ni, Cu, Zn and Al; X and Y are metals enclosed in the octahedral formed in the 2:1 typed sheet; X is at least one of Mg, Fe, Mn, Ni, Zn, Li; Y is at least one of Al, Fe, Mn and Cr.

Further, preferably, a mica-clay mineral represented as the following formula wherein $0.6 \leq a \leq 0.9$ is used:

$$[(K_aM_{0.1-b})(X_cY_d)(Si_{4-e}Al_e)O_{10}(OH_fF_{2-f})]$$

wherein $0.6 \leq a \leq 0.9$, $0 \leq b \leq 0.1$, $1.0 \leq c \leq 3$, $0 \leq d \leq 2$, $2 \leq c+d \leq 3$, $0 \leq e \leq 4$, $0 \leq f \leq 2$; M is a cation other than K which is between layers and at least one of Li, Na, Rb, Cs, NH$_4$, Be, Mg, Ca, Sr, Ba, Mn, Fe, Ni, Cu, Zn and Al; X and Y are metals enclosed in the octahedral formed in the 2:1 typed sheet; X is at least one of Mg, Fe, Mn, Ni, Zn, Li; Y is at least one of Al, Fe, Mn and Cr.

Examples of layered silicates defined in the above composition formula wherein $0.6 \leq a \leq 1.0$ include mica including specifically white mica, phlogopite, biotite, and brittle mica and its altered minerals, vermiculites including 2-octahedral typed and 3-octahedral typed vermiculites.

Examples of mica-clay minerals defined in the above composition formula wherein $0.6 \leq a \leq 0.9$ include specifically illite, sericite, glauconite, and celadonite etc.

Further, in the present invention, non-swelling layered silicates having the average particle size of the primary particles of 2 μm to 500 μm are used, and those with the range of 2 μm to 200 μm are suitably used. Since they have a characteristic of having large particle size, they swell, have fewer lamination layers and are flaked to yield very high aspect ratio, therefore, they have an effect of markedly improved heat resistance, rigidity and barrier of polymer composite materials. It becomes difficult to intercalate a positively charged organic compound between the layers if the average particle size exceeds 500 μm.

For methods for measuring the particle size, precipitation particle size measuring method, light scattering method and methods wherein the particle size is measured by direct observing the particle with a microscope and the like are applicable. Since layered silicates are lamellar crystals, the methods by a transmission electron microscope and a scanning electron microscope and the like are more suitable wherein a and b axis directions are directly observed to obtain length to breadth ratio rather than the projected two dimensional image rather than precipitation particle size measuring method or light scattering method wherein the shape is converted in spherical shape for measurement. The present invention uses the former.

Further, the amount of ion between layers is substituted such that it is charge-balanced with the negative charge which the silicate sheets have, and it may be shown as coefficient a of the chemical formula, i.e., the charge number per half unit lattice (charge density). In the present invention, those in the range of $0.6 \leq a \leq 1.0$ are used, and preferably, the range is $0.6 \leq a \leq 0.9$ since the greater the charge density, the stronger the attraction force between laminated sheets is. If the charge density is less than 0.6, it falls into the range of smectite, the particle size tends to be small, whereas if 1.0 or more, substitution between layers with an organic substance is difficult because attraction force between laminated sheets becomes too strong.

For methods for measuring the ion amount between layers of the non-swelling layered silicates, the following methods can not be applied: method for measuring cation exchange capacity (CEC), which is applied for swelling clay minerals; column infiltration method (see Japanese Clay Society ed., "Clay Handbook", 2nd. version, Gihohdo Shuppan, 576-577); methylene blue adsorption method (Japanese Bentonite Industry standard test method, JBAS-107-91) etc. Therefore, estimating methods by analyzing chemical composition are applied. Specifically, inductively coupled plasma emission (ICP) analysis, X-ray fluorescence spectroscopy (XRF), and electron probe microanalyzer (EPMA) etc. are used.

Organic-inorganic composites of the invention are obtained by intercalating organic cations to such specific non-swelling silicates. Positively charged organic compounds used in the invention include, but not limited to the type of primary, secondary and tertiary amines and chlorides thereof, quaternary ammonium salts, amine compounds, amino acid derivatives, nitrogen-containing heterocyclic compounds or phosphonium salts etc., wherein the number of carbons is not less than 8, for preferable examples.

Specifically, they include primary amines represented by octylamine, laurylamine, tetradecylamine, hexadecyl amine, stearylamine, oleylamine, acrylamine, benzylamine, amiline, etc.; secondary amines represented by dilaurylamine, ditetradecylamine, dihexadecyl amine, distearylamine, N-methylamine, etc.; tertiary amines represented by dimethyloctylamine, dimethyldecylamine, dimethyllaurylamine, dimethylmyristylamine, dimethylpalmitylamine, dimethylstearylamine, dilaurylmonomethylamine, tributylamine, trioctylamine, N,N-dimethylanikine, etc.; quaternary ammoniums such as tetrabutyl ammonium ion, tetrahexyl ammonium ion, dihexyldimethyl ammonium ion, dioctyldimethyl ammonium ion, hexatrimethyl ammonium ion, octatrimethyl ammonium ion, dodecyltrimethyl ammonium ion, hexadecyltrimethyl ammonium ion, stearyltrimethyl ammonium ion, docosenyltrimethyl ammonium ion, cetyltrimethyl ammonium ion, cetyltriethyl ammonium ion, hexadecyl ammonium ion, tetradecyldimethylbenzyl ammonium ion, stearyldimethylbenzyl ammonium ion, dioleyldimethyl ammonium ion, N-methyldiethanollauryl ammonium ion, dipropanolmonomethyllauryl ammonium ion, dimethylmonoethanollauryl ammonium ion, polyoxyethylenedodecylmonomethyl ammonium ion, quaternary substances of alkylaminopropylamines, etc. Further, they include amino acid derivatives such as leucine, cysteine, phenylalanine, tyrosine, aspartic acid, glutamic acid, lysine, 6-aminohexyl carboxylic acid, 12-aminolaurylcarboxylic acid, N—N-dimethyl-6-aminohexylcarboxylic acid, N—N-dodecyl-N,N-dimethyl-10-aminodecylcarboxylic acid, dimethyl-N-12-aminolaurylcarboxylic acid; and nitrogen-containing heterocyclic compounds such as pyridine, pyrimidine, pyrrole, imidazole, proline, γ-lactam, histidine, tryptophan, melamine, etc.

Preferably, 0.6 to 5 equivalent of the amount of the positively charged organic compound are contained in the organic-inorganic composite of the present invention, particularly, 0.8 to 2.0 equivalent are most preferable. The amount of the positively charged organic compound contained as used here does not mean only that of the positively charged organic compound which is ion-changed with K ions between layers, but also include the positively charged organic compound adsorbed physically on the surface of the organic-inorganic composite and it means the total amount of the organic substance estimated by thermal weight measurement etc. When the amount of the positively charged organic compound contained in the organic-inorganic composite is less than 0.6 equivalents of the amount of the positive ions between layers, dispersion of the organic-inorganic composite in the polymer material will be deteriorated, while when it exceeds 5 equivalent, heat resistance etc. of the polymer composite will be deteriorated due to the excessive positively charged organic compound.

The method of producing organic-inorganic composites of the invention is characterized in that concentration of the positively charged organic compound solution is not less than 0.01 N and the solid/liquid ratio of the non-swelling layered silicate/positively charged organic compound solution is not more than 0.1 (weight ratio). Concentration of less than 0.01 N can not induce sufficient ion exchange reaction and even when performing prolonged treatment, ion exchange occurs only with partial potassium ions between layers, therefore, the concentration can not be used as a filler for the polymer composite material of the present invention. Concentrations of the positively charged organic compound solution are acceptable up to the limiting concentration available as a solution. The solid/liquid ratio of the non-swelling layered silicate/positively charged organic compound solution of lower than 0.001 is not desirable in view of cost.

The ion exchange reaction which intercalates a positively charged organic compound between layers of a non-swelling layered silicate is performed by adding a powder of the layered silicate into a concentrated solution of positively charged organic compound followed by heating treatment leading exchange of K ions between layers of the layered silicate crystals with the positively charged organic compound which is then organically modified. For the treatment temperature in this case, the range of 40° C. to 200° C. are preferable. At lower than 40° C., uniform intercalation between layers of the positively charged organic compound can not be performed, whereas at higher than 200° C., decomposition or polymerization of the organic substance may be induced. Washing and filtration are then repeated to well eliminate organic cations which have not been exchanged, then dried to obtain the resultant. Production of any organic-inorganic composite can be realized by the two-step ion exchange method wherein an organic-inorganic composite is first formed with the specific positively charged organic compound, then it is exchanged again with a different positively charged organic compound.

For the treatment method to obtain any organic-inorganic composite by the two-step ion exchange reaction, the positively charged organic compounds used in the first treatment process are preferably primary to tertiary amine salts or quaternary ammonium salts wherein the number of carbons is 8 to 18. Those wherein the number of carbons is in the range of 10 to 14 are more preferable. When the number of carbons is less than 8, insertion between layers of the layered silicate can not be performed, whereas when the number of carbons exceeds 18, the positively charged organic compound is immobilized rigidly between layers and the ion-exchange reaction of the second step can not be proceeded easily.

Though the positively charged organic compounds used in the second treatment step which are different from those used in the first step are not particularly limited, the positively charged organic compounds which have higher molecular weight and higher polarity than those used in the first treatment step enable easier ion exchange. In addition, even when the positively charged organic compound used in the second treatment step has lower molecular weight and lower polarity than those used in the first step, ion exchange is possible by treating a solution of high concentration under a condition of a high temperature.

The above organic-inorganic composite of the invention is provided as a filler of the polymer composite material dispersed in the polymer material. Content of the organic-inorganic composite in the polymer material is in the range of 0.1 to 40% by mass, preferably, 1.0 to 10% by mass. Less than 0.1% by mass may not provide sufficient reinforcement effect on the polymer material, whereas more than 40% by mass may deteriorate dispersion of the organic-inorganic composite.

The polymer composite material of the invention is characterized in that the organic-inorganic composite in the polymer matrix is dispersed wherein each sheet of the silicate layer is swelled being spaced not less than 3.0 nm. More preferably, it is swelled being spaced dispersed not less than 6.0 nm to be dispersed. Less than 3.0 nm of the distance between layers does not provide good dispersion and results in insufficient improving effect on mechanical and barrier properties.

A polymer material constituting the polymer composite material of the invention includes thermosetting, energy ray setting and thermoplastic polymer materials, but any polymer material may be used without limitation particularly.

The thermosetting polymer material used in the invention is namely the thermosetting resin and specifically, it includes urethane resin, unsaturated polyester resin, epoxy resin, phenol resin, silicone resin, melamine derivatives (e.g. hexamethoxy melamine, hexabutoxylated melamine, condensed hexamethoxy melamine, etc.), urea compounds (e.g. dimethylolurea etc.), bisphenol A compounds (e.g. tetramethylolbisphenol A etc.), oxazoline compounds, oxetane compounds, etc. Combination of one or more of these thermosetting resins may be used. In addition, these thermosetting polymer material include oligomers before their setting. That is the thermosetting polymer material used of the invention refers generally those before and after setting.

For a thermosetting polymer material of the invention, epoxy resin is preferable. Epoxy resin specifically includes an epoxy compound which has one or more epoxy groups in a molecule of bisphenol A type epoxy resin, hydrogenated bisphenol A type epoxy resin, brominated bisphenol A type epoxy resin, bisphenol F type epoxy resin, novolac type epoxy resin, phenol novolac type epoxy resin, cresol novolac type epoxy resin, N-glycidyl type epoxy resin, novolac type epoxy resin of bisphenol A, chelate type epoxy resin, glyoxal type epoxy resin, amino group-containing epoxy resin, rubber-denatured epoxy resin, dicyclopentadiene phenolic type epoxy resin, silicone-denatured epoxy resin, ε-caprolactone-denatured epoxy resin, etc.

Further, in order to provide with flame resistance, those wherein atoms including halogens such as chlorine and bromine or phosphor are introduced into the structure may be used wherein they are in bounded state which make them hard to be decomposed by heat or water. Furthermore, bisphenol S type epoxy resin, diglycidyl phthalate resin, heterocyclic epoxy resin, bixylenol type epoxy resin, biphenyl type epoxy resin and tetraglycidylxylenoylethane resin, etc. may be used. Combination of one or more of these epoxy resins may be used.

In addition, it is possible to compose, as a polymer composite material, a two-liquid-mixture typed casting polymer material consisting of base resin containing an uncured oligomer component including epoxy resin, urethane resin (including urethane gum) or silicone resin and a setting agent which contains a component for setting the uncured oligomer; adhesive agent or coating material. In this case, a polymer composite material of the invention may be obtained by combining the organic-inorganic composite with at least either of the base resin or setting agent and mixing the base resin and setting agent followed by performing thermosetting process.

The base resin is a composition wherein a organic-inorganic composite and if necessary, another filler, coloring agent such as pigment and dye, or dispersing agent etc. are combined in a bisphenol uncured epoxy resin component, and viscosity is controlled with an appropriate solvent. On the other hand, for the setting agent, a setting component such as amine, isocyanate and anhydride is dissolved or dispersed in a solvent. Before use, both are mixed at a given ratio and treatment according to the purpose is performed within the pot life of the mixture composition.

That is when using the mixture composition as a casting resin material, it is casted in the mold followed by setting to obtain a given shape of a plastic body of the polymer composite material. When using the mixture composition as a coating or ink, it is applied on the surface to be coated of the substance to be coated to obtain a coated film of the polymer composite material. Further, when using the mixture composition as an adhesive agent, it is adhered on the surface to be adhered of the substance to be adhered and stuck to obtain an adhered structure wherein the substance to be adhered is adhered through the adhering layer containing an organic-inorganic composite.

The energy ray setting polymer materials of the invention are those which are set by active energy rays including visual, ultraviolet, electron, gamma and X rays and refer generally to those in the photosensitive prepolymer state and polymer materials after setting. For photosensitive prepolymers used in the invention, those which have ethylene unsaturated terminal groups are preferable.

Acrylic monomers referred herein include acrylic acids or methacrylates (acrylic acids and methacrylates are together referred as "(meth)acrylic acids") or derivatives thereof including alkyl esters, hydroxyalkylesters etc. Such photosensitive prepolymers include polyester(meth)acrylate, epoxy(meth)acrylate, urethane(meth)acrylate, polybutadiene (meth)acrylate, silicone(meth)acrylate, melamine(meth) acrylate, etc. and among them, epoxy(meth)acrylate and urethane(meth)acrylate are preferable.

These energy ray setting polymer materials are in general, often used in combination with initiators of photopolymerization. Initiators of photopolymerization may include benzophenones such as benzophenone, benzoylbezoic acid, 4-phenylbenzophenone, hydroxybenzophenone and 4,4'-bis (diethylamino)benzophenone, benzoin alkyl ethers such as benzoin, benzoin ethyl ether, benzoin isopropyl ether, benzoin butyl ether and benzoin isobutyl ether, acetophenones such as 4-phenoxydichloroacetophenone, 4-t-butyl-dichloroacetophenone, 4-t-butyl-trichloroacetophenone, diethoxyacetophenone and 2-benzyl-2-dimethylamino-1-(4-morpholinophenyl)-butanone-1, thioxanthenes such as thioxanthene, 2-chlorothioxanthene, 2-methylthioxanthene and 2,4-dimethylthioxanthene, alkylanthraquinones such as ethylanthraquinone and butylanthraquinone, and acylphosphine oxides such as 2,4,6-trimethylbenzoyldiphenylphosphine oxide. These may be used alone or as a mixture of two or more. If necessary, photosensitizer may be further used in combination.

Further, it is also possible to compose as a polymer composite material of the invention, a two-liquid-mixture typed casting polymer material consisting of a energy ray setting polymer material and a thermosetting polymer material such as epoxy resin, urethane resin (including urethane gum) or silicone resin. In this case, combining the organic-inorganic composite with at least either of the energy ray setting polymer material or the thermosetting polymer material will provide a polymer composite material with an organic-inorganic composite dispersed well after performing final setting process.

Thermoplastic polymer materials used in the invention include polyolefinic resins such as high density polyethylene, low density polyethylene, linear low density polyethylene, polypropylene, ethylene-propylene copolymer, ethylene-butene copolymer, ethylene-hexene copolymer, ethylene-vinyl acetate copolymer, ethylene-methacrylate copolymer, and ionomer resin, styrene and acrylonitrile resins such as polystyrene, styrene-acrylonitrile copolymer, styrene-acrylonitrile-butadiene copolymer, polyacrylonitrile, and styrene-ethylene-butene terpolymer, halogen-containing resins such as polyvinyl chloride, polyvinylidene chloride, and polyvinylidene fluoride, polyamide resins and their copolymers such as polycarbonate, polyacetal, polyamide 6, polyamide 66, polyamide 11, polyamide 12, aromatic polyamide, and polymethacrylimide, polyester resins such as polyethylene terephthalate, polybutylene terephthalate, polyethylene naphthalate, aliphatic polyesters, and aromatic polyesters, polyphenylene ether, polyphenylene sulfide, polysulfone resins, etc. and biodegradable resins such as polylactic acid, biodegradable aliphatic polyesters, and polycaprolactone. These may be single or combination of multiple polymer alloys, and may contain other inorganic fillers including fibrous, whisker or spherical ones.

For methods for mixing the organic-inorganic composite of the invention with thermosetting or energy ray setting polymers, specifically, it is possible to fusion-mix after mixing each component described above. For example, it may be manufactured by fusion-mixing using known mixing methods including Banbury mixer, Brabender, kneader, roll, single or multi-axis extruder and Ko-neader. For the polymer composite material in the uncured state which has been diluted with a solvent and the like and the viscosity of which at room temperature is decreased to that of ink, they may also be manufactured by known mixing methods including triple roll and bead-mill.

For methods for melt-kneading of an organic-inorganic composite of the invention with a thermoplastic polymer, melt-kneading after mixing each component described above is preferable. For example, it may be manufactured by melt-kneading using known mixing methods including Banbury mixer, Brabender, kneader, roll, single or multi-axis extruder and Ko-neader.

EXAMPLE

Examples of the invention are shown as follows, however, the invention is not limited to these examples. As a sample of the natural illite, sericite produced at Hikawa in Shimane Prefecture (Z-20, made by Hikawa Kogyo Co., Ltd.) was used. The mean particle size obtained from length and breadth of the projected two-dimensional image of the platy crystal using a scanning electron microscope (made by JEOL) JSM-5800LV at 15 kV was 10.5 μm. A mixture of Z-20 (0.5 g) and lithium tetraborate (5.0 g) was glass-beaded at 1100° C. with Bead Sampler (NT-2000, Tokyo Kagaku Co., Ltd., Rigaku-made) and subjected to quantitative analysis by fluorescence X-ray analysis (X-ray SPECTROMETER 3270, made by Rigaku Co., Ltd.).

As a result, chemical composition of the sample was: $(K_{0.78}Na_{0.03}Ca_{0.03})(Al_{1.77}Fe^{3+}_{0.12}Mg_{0.11})(Si_{3.23}Al_{0.77})O_{10}(OH)_2$ (layer charge 0.8).

As a result of powder X-ray diffraction (XRD) measurement, the distance between layers: $d_{001}$ value was 1.0 nm. Additionally, synthesized fluorine phlogopite (PDM-5B, made by Topy Industry Ltd.) which has 5 μm of mean particle size was used. 20 mg of this sample was removed, weighed in a platinum crucible, heated and melted with 0.5 g of sodium carbonate and 0.2 g of boric acid and then dissolved in 2 mL of hydrochloric acid to make a constant volume of 10 mL. It was five-fold diluted and each element was quantified with ICP emission spectrometer (IRIS AP, made by Nippon Jaleel Ashe). As a result, the sample was found to be a mica composition which has chemical composition: $K_{0.94}(Mg_{3.31})(Si_{2.96}Al_{0.93})O_{10}(F_{0.4}OH_{1.6})$ and layer charge: 0.94.

Example 1

Preparation of Organic-Inorganic Composite 1

As a positively charged organic compound, dodecylamine hydrochloride (made by Tokyo Kasei Co., Ltd.) is dissolved into pure water to prepare 0.1 M solution. To the 1 L of dodecylamine hydrochloride solution, 3 g of sericite (Z-20 classification) were placed, agitated, subjected to heat treatment at 70° C. for 4 days followed by repeated filtration/washing then dried to prepare organic-inorganic composite 1. As a result of XRD measurement of the obtained sample, distance between layers of sericite was extended to 2.3 nm.

Example 2

Preparation of Organic-Inorganic Composite 2

Organic-inorganic composite 2 was prepared similarly to Example 1 except using octadecylamine hydrochloride (made by Tokyo Kasei Co., Ltd.) as a positively charged organic compound. As a result of XRD measurement of the obtained sample, distance between layers of sericite was extended to 3.4 nm.

Example 3

Preparation of Organic-Inorganic Composite 3

As a positively charged organic compound; alkyl ($C_8$-$C_{10}$) bis(2-hydroxyethyl)methylammonium chloride (ESOCARD C/12, Lion Akzo Co., Ltd.) was used. It was dissolved in a combined solvent (1 L) of water/isopropyl alcohol (50/50 vol) to prepare 0.1 M solution. To this, the organic-inorganic composite 1 obtained in the above EXAMPLE 1 (2 g) was placed, subjected to treatment at 70° C. for 4 days followed by repeated filtration/washing then dried to prepare organic-inorganic composite 3. As a result of XRD measurement of the obtained sample, distance between layers of sericite was 2.1 nm.

Example 4

As a layered silicate, 3 g of synthesized fluorine phlogopite (PDM-5B, made by Topy Industry Ltd.) was placed into 1 L of 0.1 M solution of dodecyl amine hydrochloride (made by Tokyo Kasei Co., Ltd.), agitated and subjected to heat treatment at 100° C. for 5 days followed by repeated filtration/washing then dried to prepare organic-inorganic composite 4. As a result of XRD measurement of the obtained sample, distance between layers of synthesized fluorine phlogopite was extended to 2.3 nm.

Example 5

The organic-inorganic composite 1 prepared in EXAMPLE 1 was mixed with bisphenol A-typed epoxy resin Epikote 828 (made by Japan Epoxy Resin Co., Ltd.) using a triple roll mill (DR-35, Kaneda Rika Kogyo Co., Ltd.) to prepare a base resin containing 10% by mass of the organic-inorganic composite 1. Methylnadinic acid anhydride (WAKO) as a setting agent was then added in an amount of 80 parts by weight based on 100 parts by weight of epoxy resin in the base resin and agitated. Further, N,N-dimethylbenzylamine (Aldrich) as a curring catalyst was added in an amount of 0.02 parts by weight based on 100 parts by weight of the total mixture, and agitated again. The liquid sample was then poured into a mold of 100 μm in thickness in order to orientate the organic-inorganic composite and subjected to setting treatment at 180° C. in compression between glass plates.

Figure 1:
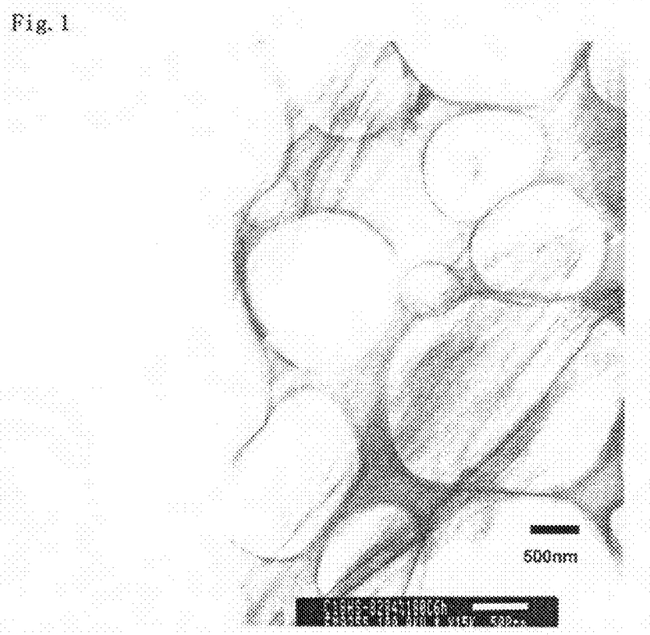
FIG. 1 is a TEM picture of organic sericite-epoxy composite material obtained in Example 5.

As a result of XRD measurement of this sample, the bottom reflection has broadened and $d_{001}$ value increased to about 8.0 nm. Also, ultrathin sections of about 90 nm were prepared from this oriented sample with an ultramicrotome (ULTRACUT UCT, Leica, Inc.) and dispersion of the organic-inorganic composite was observed with a transmission electron microscope, TEM (JEM 1010, JEOL Co., Ltd.) under 100 kV of acceleration voltage. As a result, it was noted that flexible sericite sheets 1 nm in thickness and more than 5 μm in length were delaminated and dispersed (FIG. 1).

Example 6

Figure 2:
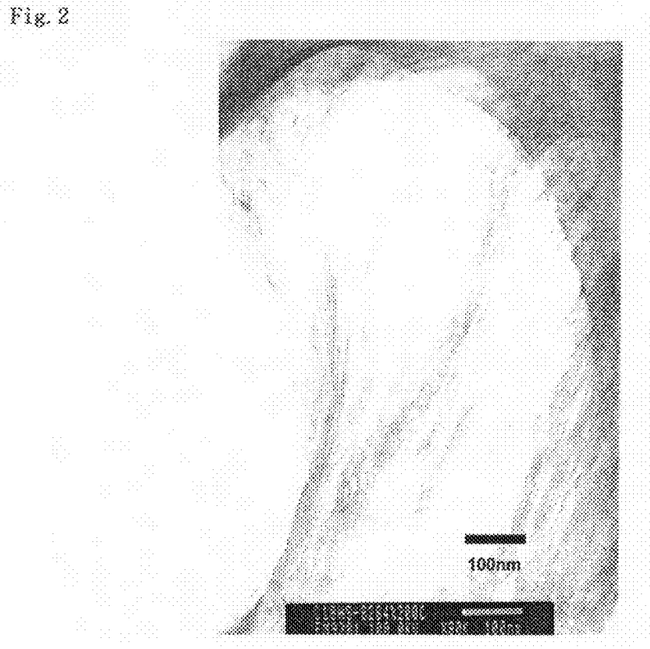
FIG. 2 is a TEM picture of organic sericite-polyamide 6 composite material obtained in Example 6.

The organic-inorganic composite 2 prepared in EXAMPLE 2 was mixed with polyamide-6 (Novamid 1010C2, made by Mitsubishi Engineering Plastics Co., Ltd.) and melt-kneaded at 240° C. using a mixer unit of Laboplastomill (made by Toyo Seiki Seisaku-Sho Ltd.) to prepare a polymer composite material. Content of the organic-inorganic composite 2 in this polymer composite material is 5 mass %. Further, this sample was pressed at 260° C. to prepare a film plastic body 200 μm in thickness. As a result of XRD measurement, sharp bottom reflection ($d_{001}$ value=3.4 nm) indicating laminated structure of the organic-inorganic composite had disappeared and for slightly left broad bottom reflection, $d_{001}$ value was about 4.0 nm. As a result of TEM observation, it was noted that flexible sericite sheets 1 nm in thickness and more than 5 μm in length were delaminated and dispersed (FIG. 2). This revealed that the laminated structure of organic-inorganic composite had been exfoliated and nanocomposite had been formed.

Example 7

Figure 3:
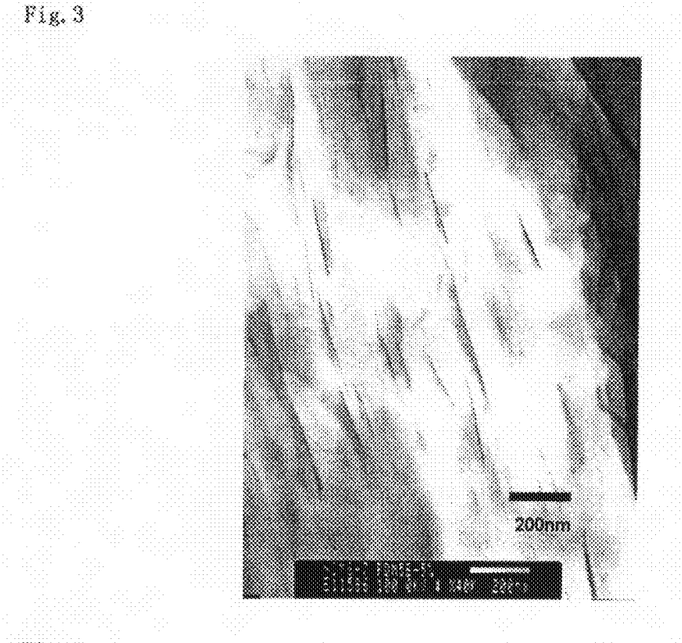
FIG. 3 is a TEM picture of organic synthesized phlogopite-polyamide 6 composite material obtained in Example 7.

Polyamide composite 6 was prepared similarly to EXAMPLE 6 except using organic-inorganic composite 4 prepared in EXAMPLE 4. As a result of XRD measurement, sharp bottom reflection ($d_{001}$ value=2.3 nm) which is indicative of laminated structure of the organic-inorganic composite had disappeared and it is confirmed that phlogopite sheets 1 nm in thickness and more than 5 μm in length were delaminated and dispersed (FIG. 3). This revealed that the laminated structure of organic-inorganic composite had been exfoliated and nanocomposite had been formed.

Comparative Example 1

Treatment was performed similarly to EXAMPLE 1 except using 0.002 M dodecylamine hydrochloride solution as a positively charged organic compound. As a result of XRD measurement, $d_{001}$ value was about 1.0 nm and dodecylamine hydrochloride had not been intercalated between layers of Z-20.

Comparative Example 2

Figure 4:
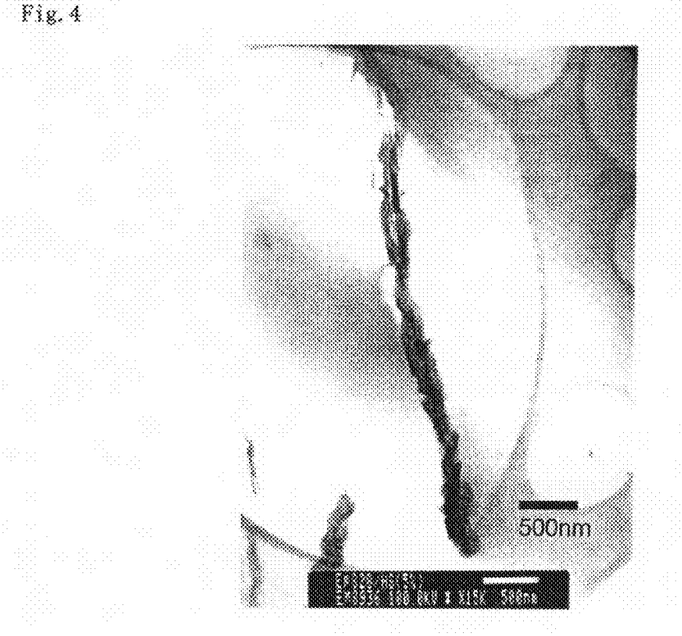
FIG. 4 is a TEM picture of sericite-epoxy composite material obtained in Comparative Example 2.

All treatment was performed similarly to EXAMPLE 5 except using sericite (Z-20) instead of the organic-inorganic composite. As a result of XRD measurement of the obtained polymer composite material, $d_{001}$ value was about 1.0 nm and it is confirmed that rigid sericite particles (cross section) about 0.1 µm in thickness and more than 5 µm in length were dispersed in the TEM image (FIG. 4). Z-20 in the polymer matrix had not been delaminated and dispersed at all.

Comparative Example 3

Figure 5:
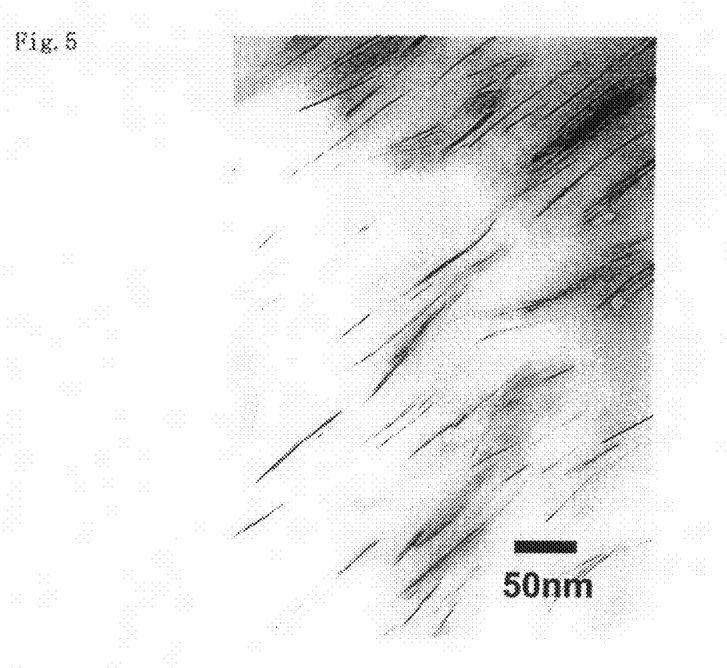
FIG. 5 is a TEM picture of organic synthesized fluorine mica-polyamide 6 composite material obtained in Comparative Example 3.

All treatment was performed similarly to EXAMPLE 5 except using an organically synthesized mica (MAE, Corp Chemical Co., Ltd.) which was Na-synthesized fluoro mica organically treated with dioctadecyldimethylammonium chloride, instead of the organic-inorganic composite used in EXAMPLE 5. As a result of XRD measurement of the obtained polymer composite material, broad bottom reflection with $d_{001}$ value of about 4.0 nm was only slightly confirmed. Results of the TEM measurement confirmed that for the synthesized fluoro mica layers dispersed, layers 1 nm in thickness were uniformly dispersed in the state of monolayers or laminate of a few layers in the polymer matrix, while those length were 0.1 µm to 0.2 µm (FIG. 5).

INDUSTRIAL APPLICABILITY

The present invention relates to an organic-inorganic composite obtained by treating a non-swelling layered silicate which has large primary particle size with concentrated solution of a positively charged organic compound, and a polymer composite material which has the organic-inorganic composite well dispersed. The organic-inorganic composite of the invention is useful as a sheeted filler having a high aspect ratio and it is suitable for construction materials which require lightness as well as high heat resistance and mechanical properties, and films, sheets, bottles, tank-forming materials, adhesive and coating agents which require high gas barrier etc. since the organic-inorganic composite can be dispersed in a polymer material matrix to further increase the aspect ratio.

The invention claimed is:

1. An organic-inorganic composite, comprising:
   a non-swelling layered silicate comprising mica and having K ions between layers of the non-swelling layered silicate and an average particle size of primary particles of 2 µm to 500 µm; and
   a positively charged organic compound,
   wherein the positively charged organic compound is directly intercalated into the non-swelling layered silicate,
   the layered silicate is represented as the following formula:

$[(K_aM_{0.1-b})(X_cY_d)(Si_{4-e}Al_e)O_{10}(OH_fF_{2-f})]$ wherein $0.6 \leq a \leq 1.0$, $0 \leq b \leq 0.1$, $1.0 \leq c \leq 3$, $0 \leq d \leq 2$, $2 \leq c+d \leq 3$, $0 \leq e \leq 4$, $0 \leq f \leq 2$;
   M is a cation other than K which is between layers and at least one of Li, Na, Rb, Cs, $NH_4$, Be, Mg, Ca, Sr, Ba, Mn, Fe, Ni, Cu, Zn and Al;
   X and Y are metals enclosed in an octahedral formed in a 2:1 typed sheet;
   X is at least one of Mg, Fe, Mn, Ni, Zn and Li; and Y is at least one of Al, Fe, Mn and Cr, and
   the K ion is ion-exchanged with the positively charged organic compound, and 0.6 to 5 equivalents of the positively charged organic compound to a cation exchange volume of the layered silicate are contained in the organic-inorganic composite.

2. The organic-inorganic composite according to claim 1, wherein the layered silicate is a mica clay mineral represented as the following general formula:

$[(K_aM_{0.1-b})(X_cY_d)(Si_{4-e}Al_e)O_{10}(OH_fF_{2-f})]$ wherein $0.6 \leq a \leq 0.9$, $0 \leq b \leq 0.1$, $1.0 \leq c \leq 3$, $0 \leq d \leq 2$, $2 \leq c+d \leq 3$, $0 \leq e \leq 4$, $0 \leq f \leq 2$; M is a cation other than K which is between the layers, and is at least one of Li, Na, Rb, Cs, $NH_4$, Be, Mg, Ca, Sr, Ba, Mn, Fe, Ni, Cu, Zn and Al; X and Y are metals enclosed in an octahedral formed in a 2:1 typed sheet; X is at least one of Mg, Fe, Mn, Ni, Zn and Li; Y is at least one of Al, Fe, Mn and Cr.

3. The organic-inorganic composite according to claim 1, wherein the positively charged organic compound is selected from primary to tertiary amine salts, a quaternary ammonium salt and an amino acid salt, wherein the number of carbons is not less than 8.

4. A polymer composite material, comprising 0.1 to 40% by mass of the organic-inorganic composite according to claim 1 therein.

5. The polymer composite material according to claim 4, wherein the organic-inorganic composite is dispersed in the polymer composite material in a swelling state such that the average distance between the layers of the layered silicate is not less than 3.0 nm.

6. A method of producing an organic-inorganic composite, comprising:
   a step (I) wherein the layered silicate according to claim 1 is contacted with (a) positively charged organic compound (a) at 40-200° C. to form an organic-inorganic composite (A),
   wherein K ion between the layers is substituted with the positively charged organic compound (a), and
   a concentration of the positively charged organic compound is at least 0.01N.

7. A method of producing an organic-inorganic composite, comprising:
   a step (I) wherein the layered silicate according to claim 1 is contacted with a positively charged organic compound (a) at 40-200° C. to form an organic-inorganic composite (A) wherein K ion between the layers is substituted with the positively charged organic compound (a), followed by
   a step (II) wherein a positively charged organic compound (b) which is a different species from the positively charged organic compound (a) is contacted with the organic-inorganic composite (A) to form an organic-inorganic composite (B) wherein the positively charged organic compound (a) is substituted with the positively charged organic compound (b),
   wherein a concentration of the positively charged organic compound is at least 0.01N.

8. The method of producing an organic-inorganic composite according to claim 7, wherein the positively charged organic compound (a) used in the step (I) of the process for producing the organic-inorganic composite (B) is at least one selected from primary to tertiary amine salts, a quaternary ammonium salt, wherein the number of carbons is not less than 8.

9. The method of producing an organic-inorganic composite according to claim 7, wherein a solid liquid ratio of the layered silicate/the positively charged organic compound solution is not more than 0.1 (mass ratio) in the step (I) and the step (II).

10. The method of producing a polymer composite material, wherein 0.1 to 40% by mass of the organic-inorganic composite according to claim 1 is added as a filler in the polymer material.

11. A polymer composite material, comprising 0.1 to 40% by mass of the organic-inorganic composite according to claim 2 therein.

12. A polymer composite material, comprising 0.1 to 40% by mass of the organic-inorganic composite according to claim 3 therein.

13. A polymer composite material, comprising 0.1 to 40% by mass of the organic-inorganic composite according to claim 1 therein.

14. The polymer composite material according to claim 11, wherein the organic-inorganic composite is dispersed in the polymer composite material in a swelling state such that the average distance between the layers of the layered silicate is not less than 3.0 nm.

15. The polymer composite material according to claim 12, wherein the organic-inorganic composite is dispersed in the polymer composite material in a swelling state such that the average distance between the layers of the layered silicate is not less than 3.0 nm.

16. The polymer composite material according to claim 13, wherein the organic-inorganic composite is dispersed in the polymer composite material in a swelling state such that the average distance between the layers of the layered silicate is not less than 3.0 nm.

17. The method of producing a polymer composite material, wherein 0.1 to 40% by mass of the organic-inorganic composite according to claim 2 is added as a filler in the polymer material.

18. The method of producing a polymer composite material, wherein 0.1 to 40% by mass of the organic-inorganic composite according to claim 3 is added as a filler in the polymer material.

19. The method of producing a polymer composite material, wherein 0.1 to 40% by mass of the organic-inorganic composite according to claim 1 is added as a filler in the polymer material.

20. The organic-inorganic composite according to claim 1, wherein the positively charged organic compound has the primary particles of 5 μm to 500 μm as an average particle diameter.

21. The organic-inorganic composite according to claim 1, wherein an interlayer distance when intercalated is more than 2 nm.

22. The organic-inorganic composite according to claim 20, wherein the positively charged organic compound is directly intercalated into the non-swelling layered silicate, which is a unit layer, having an average aspect ratio of the diameter/a thickness of more than 5000.

\* \* \* \* \*